US008103969B2

(12) United States Patent
Gupta et al.

(10) Patent No.: US 8,103,969 B2
(45) Date of Patent: Jan. 24, 2012

(54) AUTOMATIC GENERATION OF TV HISTORY LIST THAT STACKS TV CHANNELS AND OTHER OBJECTS

(75) Inventors: Manish Gupta, San Diego, CA (US); Tracy Ho, San Diego, CA (US); Sabrina Yeh, Laguna Beach, CA (US)

(73) Assignees: Sony Corporation, Tokyo (JP); Sony Electroics Inc., Park Ridge, NJ (US)

( * ) Notice: Subject to any disclaimer, the term of this patent is extended or adjusted under 35 U.S.C. 154(b) by 212 days.

(21) Appl. No.: 12/387,803

(22) Filed: May 7, 2009

(65) Prior Publication Data

US 2009/0222757 A1   Sep. 3, 2009

(51) Int. Cl.
  *G06F 3/048* (2006.01)
(52) U.S. Cl. ......................... 715/825; 715/844
(58) Field of Classification Search .................. 715/719, 715/46, 824, 844
  See application file for complete search history.

(56) References Cited

U.S. PATENT DOCUMENTS

| | | | | |
|---|---|---|---|---|
| 5,323,240 A * | 6/1994 | Amano et al. ................. | 348/731 |
| 5,594,509 A * | 1/1997 | Florin et al. ..................... | 725/43 |
| 5,757,414 A | 5/1998 | Thorne | |
| 5,801,747 A * | 9/1998 | Bedard ............................ | 725/46 |
| 6,141,003 A * | 10/2000 | Chor et al. ..................... | 715/719 |
| 6,177,931 B1 * | 1/2001 | Alexander et al. ............... | 725/52 |
| 6,795,972 B2 | 9/2004 | Rovira | |
| 6,961,752 B2 * | 11/2005 | Jones et al. .................... | 709/203 |
| 7,185,292 B2 * | 2/2007 | Pinsky et al. .................. | 715/867 |
| 7,299,484 B2 * | 11/2007 | Thompson ....................... | 725/38 |
| 7,441,196 B2 * | 10/2008 | Gottfurcht et al. ............ | 715/740 |
| 7,441,260 B1 | 10/2008 | Kurapati | |
| 7,600,239 B2 * | 10/2009 | De Lange et al. ............... | 725/36 |
| 7,831,987 B2 * | 11/2010 | Shikata et al. .................. | 725/41 |
| 2002/0056098 A1 * | 5/2002 | White ............................. | 725/39 |
| 2002/0059610 A1 | 5/2002 | Ellis | |
| 2002/0078447 A1 * | 6/2002 | Mizutome et al. .............. | 725/37 |
| 2002/0083448 A1 * | 6/2002 | Johnson ......................... | 725/39 |
| 2002/0174430 A1 | 11/2002 | Ellis et al. | |
| 2003/0005443 A1 * | 1/2003 | Axelsson et al. ............... | 725/46 |
| 2005/0149969 A1 | 7/2005 | Kumar | |
| 2005/0257166 A1 | 11/2005 | Tu | |
| 2007/0009229 A1 * | 1/2007 | Liu ................................ | 386/83 |
| 2007/0028287 A1 * | 2/2007 | Yamamoto et al. ........... | 725/135 |

(Continued)

OTHER PUBLICATIONS

Reenskaug, Trygve; "Models-Views-Controllers" published Dec. 10, 1979.*

(Continued)

*Primary Examiner* — Doon Chow
*Assistant Examiner* — Wilson Varga
(74) *Attorney, Agent, or Firm* — Miller Patent Services; Jerry A. Miller

(57) ABSTRACT

A television system presents the user with a list of recently viewed objects as a History list that meets one of a set of History list criteria. The History list is maintained as an ordered stack list with a limited number of entries, the order being an order in which the most recently met rule appears at the top of the list. This abstract is not to be considered limiting, since other embodiments may deviate from the features described in this abstract.

20 Claims, 7 Drawing Sheets

U.S. PATENT DOCUMENTS

2007/0107015 A1 5/2007 Kazama et al.
2007/0189737 A1* 8/2007 Chaudhri et al. ............. 386/125
2007/0266403 A1* 11/2007 Ou et al. ......................... 725/46
2008/0148317 A1* 6/2008 Opaluch ......................... 725/46
2008/0209474 A1 8/2008 Pjanovic et al.

OTHER PUBLICATIONS

U.S. Appl. No. 12/027,358, filed Feb. 7, 2008 to Baurmann et al.
"Quick Setup Guide: Connecting your New Bravia LCD HDTV," Sony, Date unknown.

* cited by examiner

AUTOMATIC GENERATION OF TV HISTORY LIST THAT STACKS TV CHANNELS AND OTHER OBJECTS

CROSS REFERENCE TO RELATED DOCUMENTS

This application is related to U.S. patent application Ser. No. 12/027,358 filed Feb. 7, 2008 which is hereby incorporated herein by reference.

COPYRIGHT NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever.

BACKGROUND

TVs increasingly grow sophisticated as centers of home entertainment systems. An outcome of this trend is that TVs increasingly can be used to present a wide variety of content from various content sources, TV channels being but one type of content source. As TVs become capable of presenting an ever-expanding selection of content from different sources, the present invention recognizes that it is desirable to provide users with easy to use tools for content management, among them the ability to establish subsets of content that are favored by the users.

BRIEF DESCRIPTION OF THE DRAWINGS

Certain illustrative embodiments illustrating organization and method of operation, together with objects and advantages may be best understood by reference detailed description that follows taken in conjunction with the accompanying drawings in which.

DETAILED DESCRIPTION

Figure 1:
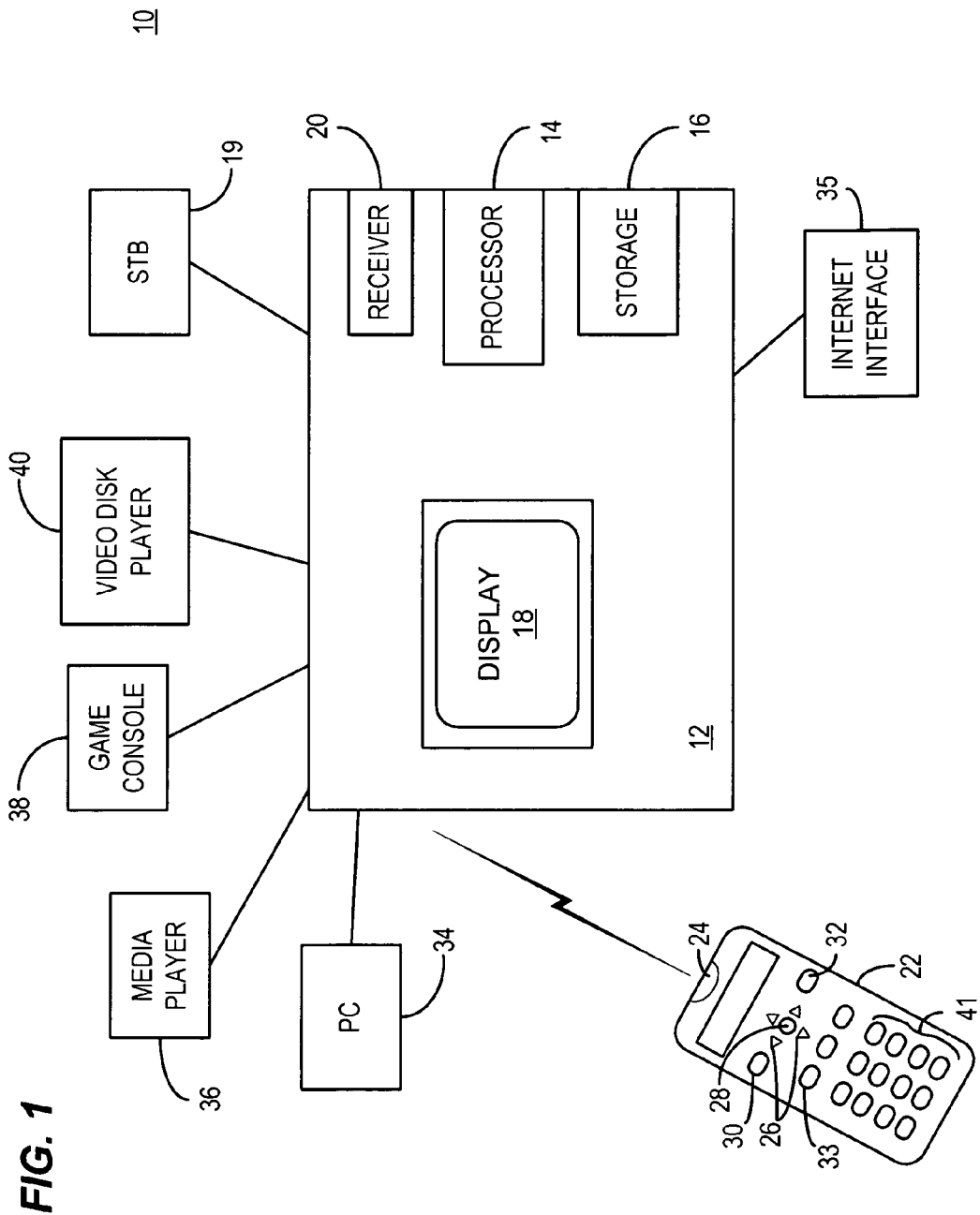
FIG. 1 is an example block diagram of a television entertainment system consistent with certain embodiments of the present invention.

While this invention is susceptible of embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically. The term "program" or "computer program" or similar terms, as used herein, is defined as a sequence of instructions designed for execution on a computer system. A "program", or "computer program", may include a subroutine, a function, a procedure, an object method, an object implementation, in an executable application, an applet, a servlet, a source code, an object code, a shared library/dynamic load library and/or other sequence of instructions designed for execution on a computer system. The term "processor" can mean either a programmable device on which a program runs, or a dedicated hardware device that carries out a process.

The term "program", as used herein, may also be used in a second context (the above definition being for the first context). In the second context, the term is used in the sense of a "television program". In this context, the term is used to mean any coherent sequence of audio video content such as those which would be interpreted as and reported in an electronic program guide (EPG) as a single television program, without regard for whether the content is a movie, sporting event, segment of a multi-part series, news broadcast, etc. The term may also be interpreted to encompass commercial spots and other program-like content which may not be reported as a program in an electronic program guide and video clips or other content that may be stored as self-contained files or video clips stored on, for example, a PC or a USB storage device to be played back, or video content that can be streamed from an Internet site.

Reference throughout this document to "one embodiment", "certain embodiments", "an embodiment", "an example", "an implementation" or similar terms means that a particular feature, structure, or characteristic described in connection with the embodiment, example or implementation is included in at least one embodiment, example or implementation of the present invention. Thus, the appearances of such phrases or in various places throughout this specification are not necessarily all referring to the same embodiment, example or implementation. Furthermore, the particular features, structures, or characteristics may be combined in any suitable manner in one or more embodiments, examples or implementations without limitation.

The term "or" as used herein is to be interpreted as an inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

For purposes of this document, the term "Widget" is used to mean a lightweight software application that is designed to operate in a television receiver environment that is available to carry out various dedicated functions for the user. In the modern TV environment, such programs may interact with storage, the Internet, a cable or satellite system, other TV related software and hardware components responsible for the normal functioning of the TV through a specific interface, other Widgets on the TV or other entities to carry out various functions for the convenience of the user. The user can launch or terminate such Widgets by selecting them from a menu, through user input via a key on the TV's remote control, voice activation, gesture activation or the like, through an automatic contextual launch where the TV program deemed as appropriate or other interface in order to access or restrict their functionality in the television environment. The "Widget" may exist as a program independently on the system, or on a common Widget platform where global variables may affect the Widget in terms of functionality, operability, visibility or the like. The Widget operates as a computer program running on the TV's central processor or on another processor within the television. Widgets can be used like a computer program by a TV viewer to implement functions that have not been available to the user the TV user in the past. For example, a Widget can be developed to provide access to email, play games, provide weather forecasts, provide clock functions, provide RSS feeds, display a photo album, or some other content that is being received via the web which displayed on the TV with the proper means, etc.

Referring initially to FIG. 1, an example system is shown, generally designated 10, that includes a television (TV) 12 with TV processor 14 and tangible digital storage medium 16 that may be, without limitation, a magnetic or optical disk drive, a solid state device such as random access memory or read-only memory or flash memory, a removable stick medium or removable floppy disk, etc. The medium 16 and processor 14 may be stored in the TV housing as shown along with a display 18 such as but not limited to a high definition (HD) matrix display or a standard definition cathode ray tube display, or the processor 14 and/or medium 16 may be external to the TV housing, e.g., in a set-top box 19.

The TV 12 may include a wireless receiver such as but not limited to an IR receiver 20 for receiving wireless signals from a hand-held remote control 22 having a wireless transmitter such as but not limited to an IR transmitter 24. Up/down and left/right cursor direction keys 26 can be included on the remote control 22, as can be an enter key 28. A "Favorites" key 30 can be provided on the remote control and labeled as such or bearing some other label but generating a signal when manipulated that is interpreted by the TV processor 14 as a command to show Favorites in accordance with principles below. An "exit" key 32 can also be provided to exit the display of Favorites icons as discussed below. A "History" key 33 can also be provided to directly enter a "History" function as will be described. However, other embodiments may provide varying entry points to the History function described herein using various paradigms without departing from embodiments consistent with the present invention.

TV 12 may communicate with one or more sources of content, including the set top box (STB) 19, which is a source of TV channel content, as well as, e.g., a personal computer (PC) 34, a media player 36 that can store photos and music files and folders, a game console 38 that can store computer games for playing on the TV 12, and a video disk player 40 such as a Blu-Ray or DVD player for playing content from video disks on the TV 12. Personal video recorders (PVRs) and other content sources may also be included in the system. The remote controller can also include a so-called 10-key pad having digits 0-9 and generally two other keys (ironically totaling 12 keys) such as "*" and "#" as in a conventional telephone keypad for direct tuning of a television channel.

Figure 2:
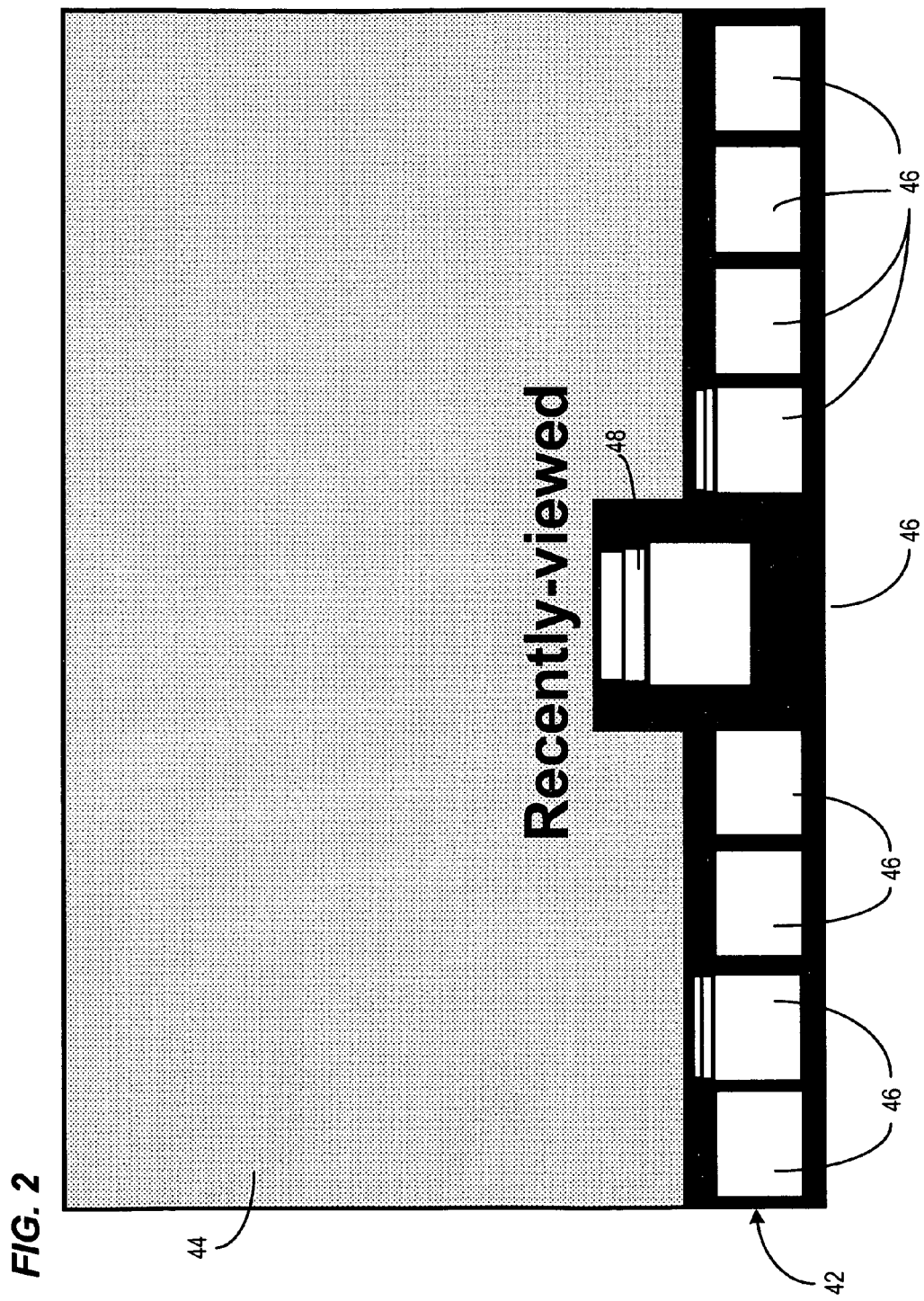
FIG. 2 is an example illustrative screen shot of a GUI consistent with certain embodiments of the present invention.

FIG. 2 shows that a Favorites Graphical User Interface GUI 42 can be superimposed on a current video presentation 44 when a user manipulates the Favorite button 30 on the remote control 22. As shown, the GUI 42 includes one or more objects 46, also referred to herein as "icons", that are arranged in this example in the single row shown near the bottom of the display. Each object 46 is associated with a source of content. Some objects 46 are associated with respective TV channels that a user has designated as Favorites in accordance with disclosure below. Other objects may be associated with photo and/or music files or folders from, e.g., the media player 36, while other objects may be associated with user-designated favorite videos from the disk player 40 or game console 38. Additionally, content from Internet Protocol TV (IPTV) may be obtained via an Internet video interface 35, e.g., using Sony's BIVL™ (Bravia™ Internet Video Link).

When an object is associated with a TV channel, a live video feed from that channel or an icon representing that channel can be displayed within the object. An object associated with a photo folder may be a thumbnail of a representative (e.g., first) photo in the folder. Objects for Favorite inputs such as from a disk player or other source devices may be video from programs stored on that device or a still thumbnail or icon representing the source device.

As shown in FIG. 2, the center-most object 46 in this example is a currently focused icon in that it is enlarged relative to the other icons, and that, should the user manipulate, e.g., the enter key 28 on the remote, the processor 14 automatically causes the TV channel associated with the object to be tuned to and displayed in the current video presentation 44. Or, if the currently focused object 46 represents content such as photos or media files that require applications to view, upon receipt of the user selection command the processor 44 launches the application that is required to view content from the source associated with the focused object or icon 46 to cause the content to be displayed on the TV.

When the user manipulates the left or right arrows on the remote, the GUI 42 revolves left or right across the display, moving a new icon into the center-most (focused) spot and enlarging it relative to the other icons, with the former focused icon being moved away from the center spot and reduced in size. Furthermore, when metadata is known for the source of content (as it can be using electronic listing data sources or via broadcast stream System information (SI) metadata), the metadata can be presented with the associated icon. The metadata can include a TV channel logo and a textual description of a program. The metadata may be presented for each visible icon or it may be presented only for the focused icon. The GUI can also include information on a program in a future time slot for a source associated with the currently focused icon.

Figure 3:
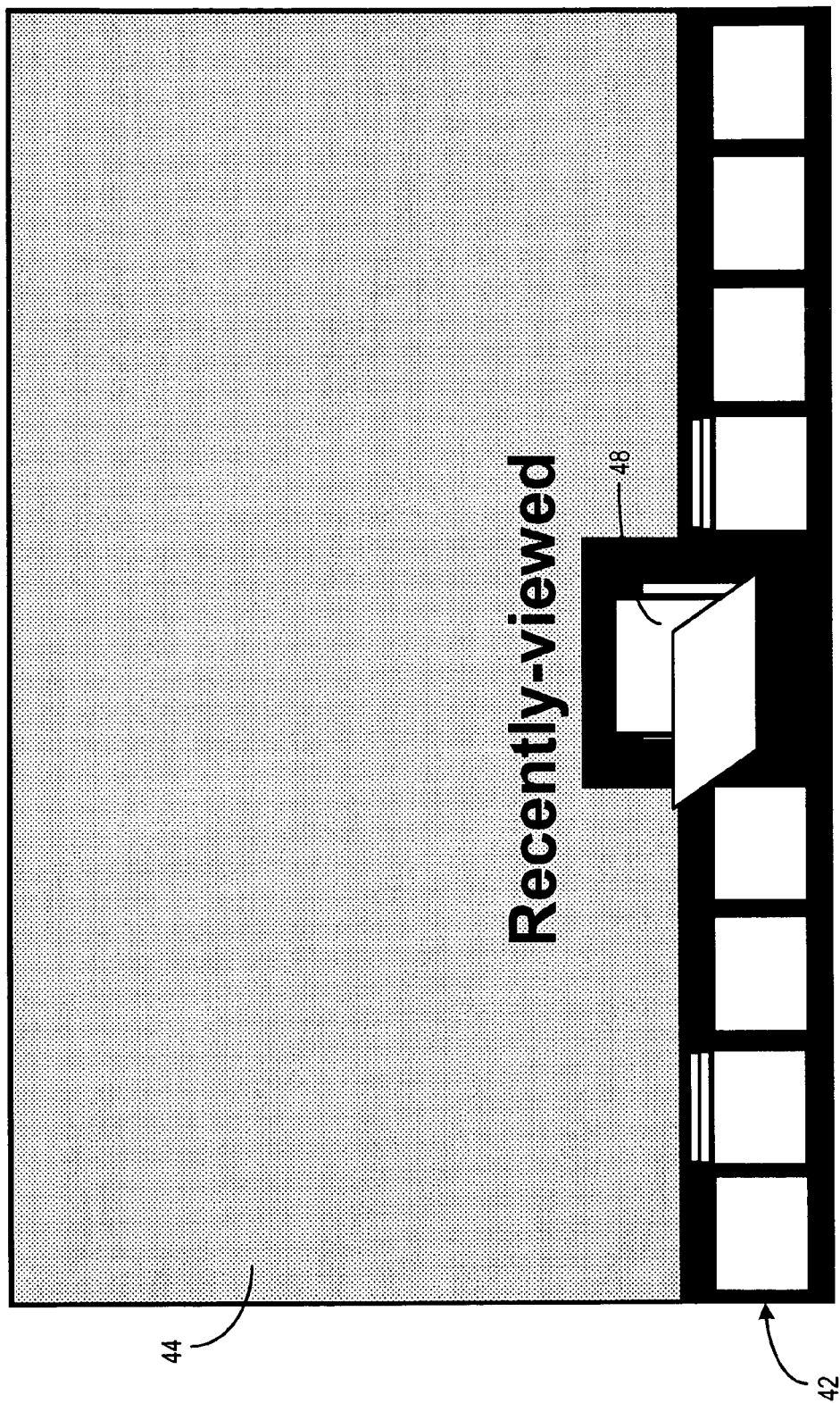
FIG. 3 is an example illustrative screen shot of a GUI consistent with certain embodiments of the present invention.

Additionally, a list of recently viewed items or History is presentable in response to a user-generated signal, and the History list can be juxtaposed with the icons. In one implementation the History list may contain, e.g., the last ten things (TV channels, TV inputs such as disc players such as Blu Ray Disc players or DVD players, IPTV provider or content, photo albums, etc.) viewed, or it can contain only the last, e.g., ten TV channels viewed. In any case, the list may be navigated by manipulating the remote control to scroll through the list of recently viewed items shown in the GUI. In the example presented, the icons 48 are scrolled like pages of a book or papers in a file as depicted in FIG. 3 by manipulation of the remote control's up and down (or left and right) cursor control buttons such as 26 to reveal prior or next objects on the History list. Manipulation of the up arrow may result in the older entry or entries of the list to be presented, while manipulation of the down arrow may result in the newer entry or entries of the list to be presented.

Figure 4:
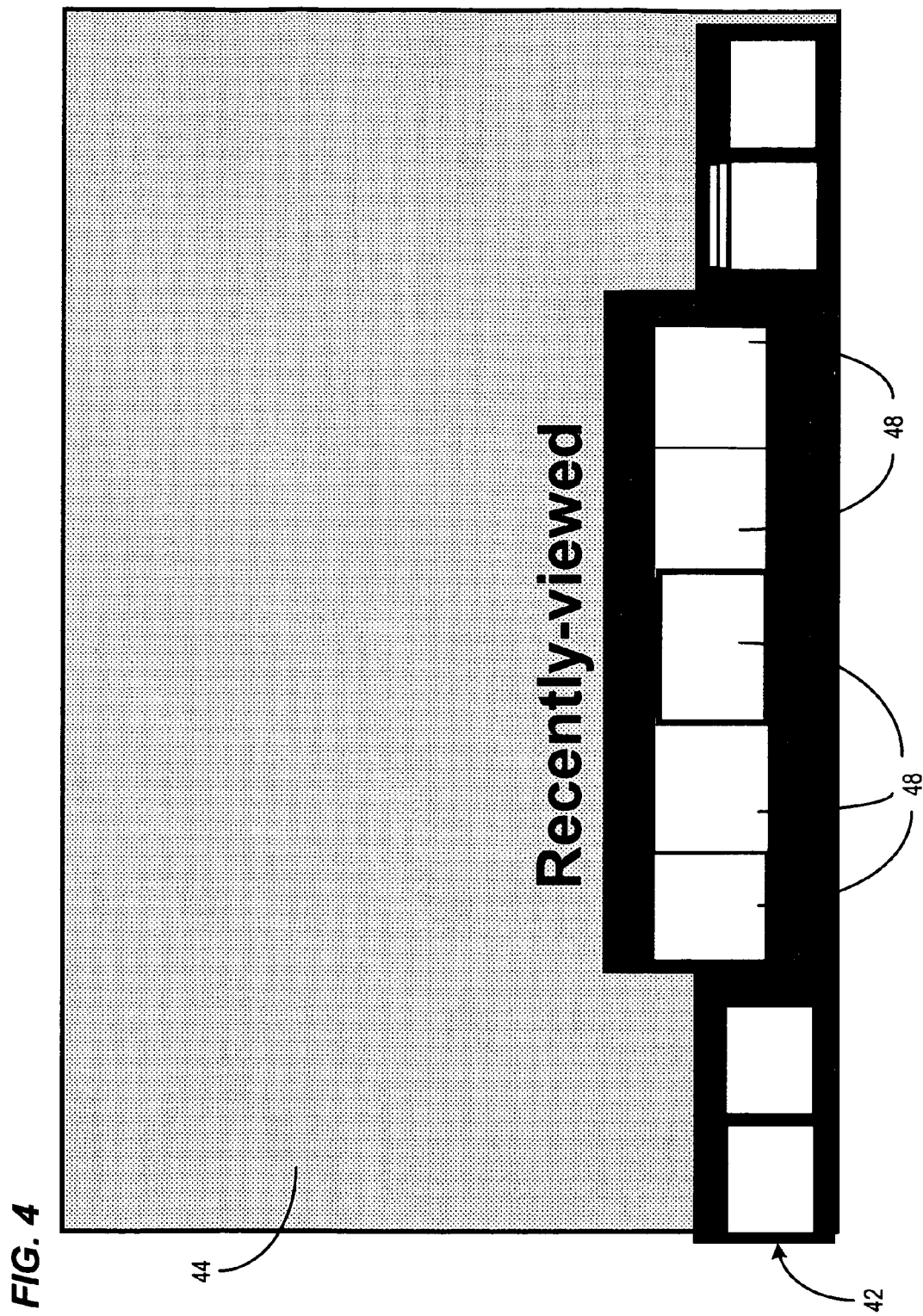
FIG. 4 is an example illustrative screen shot of a GUI consistent with certain embodiments of the present invention.

History, or "recently viewed" content, is automatically saved according to the process depicted in FIG. 5 in an example embodiment as a part of the "Favorites" feature as will be described later. The recently viewed content can be viewed as shown in FIG. 2 in a group or stack within the Favorites row 42 in the GUI and can be navigated vertically to reveal the objects in the History list in a manner similar to moving between pages within a file folder. The recently viewed content can also be viewed as either grouped as stacked icons as shown in FIG. 3 with the History list being shown highlighted (larger) by default or in a row as in FIG. 4 so that the History list is easily previewed without need to scroll. In the row format, each of the History icons are arranged side by side, with the order determined by having the most recent in the front middle and the second and third being to the left and right of center with the list alternating left to right until the end. In other arrangements, a side-by-side arrangement can start at the left, for example, and proceed to the right. Thus, as depicted, the menu of Favorites is displayed as a horizontal sequence of icons with a plurality of History list entries situated at the center of the horizontal sequence of icons, where a latest entry is at the center and is flanked by other History list entries. The History list entries are selected by default upon invocation of the menu of Favorites and are displayed as a larger icon or in a larger icon window than other icons in the sequence of icons in this implementation. Other arrangements are also possible. Such views can be established by either a remote control button or via setup or menu selection without limitation.

The Favorites feature ("Favorites") discussed above, including presenting the objects or icons 46, can be invoked from the remote control 22 by pressing the Favorites key 30. If there is on-screen display (OSD) text on the screen (e.g., a banner) when <Favorites> is pressed, the OSD can be removed and the Favorites icons 46 displayed.

The states in which Favorites is available may include the following. Favorites can be accessed at any time by pressing the <FAVORITES> key 30, except for interrupting certain other applications (such as Initial Setup, Auto Program, Digital Channel Add, etc.) as may be specified by other specifications. Also, Favorites can be allowed in External Input mode, including PC input mode. Pressing <Favorites> will launch the Favorites on top of the external input using OSD overlaid on top of live video. In a cross media bar menu or other menu system (XMB) Photo/Music Viewer and Ambient Player modes, pressing <FAVORITES> will exit from Photo/Music Viewer or Ambient Player, and display Favorites icons 46 overlaid on top of live video or on background wallpaper. On the other hand, if the system is in a multi-picture mode (e.g., picture-in-picture (PIP), picture and picture (PAP), etc.) and the <FAVORITES> key 30 is pressed, the TV exits from the respective multi-picture mode and returns to single picture mode to display the Favorites application. The "History" function can be invoked as a part of the Favorites, or can be directly invoked from the remote controller or invoked in other ways as desired.

Favorites interaction with other OSD can be defined according to a set of defined rules that are adapted to suit the particular television environment such as:
  if other OSD is displayed, existing rules defined in the remote control key response are employed. For example: Muting (do not remove Muting, but display Favorites OSD with Muting still visible on top of Favorites).
  Closed caption (CC): If the television cannot simultaneously display CC text and Favorites, allow users to press <CC> to toggle it on/off/on when muted, but suppress CC text from displaying. When user exits Favorites, and if CC was toggled On, display CC text. If the television can simultaneously display CC text and Favorites in some manner, then it may do so by relocation of the CC text so there is no confusing overlap in the display.
  Blocked Channel/Program OSD: Display Favorites overlaid on top of the blocked message.
Other rules can be devised to account for interaction with other TV functions.

With respect to Favorite content objects, from the Favorites viewing screen, there are main single content objects that display persistently, and other single content objects that users can add to the entry screen when they specify Favorite items. Selecting any single object will play, tune, or change input to that object. For instance, selecting a Favorite Channel object 46 will tune to that channel. Selecting a Favorite Photo folder object 46 will play the associated photo slideshow. Other items can include lists (list of channels, list of photos, etc.). Favorites allows other items to be stacked as a list. For example, some users with lots of Favorites might want all their channels in a separate list that they can flip through, rather than having many channels laid out in a row. It is up to the user to choose how to display. One of the Favorites, as noted above, is the History function which serves as a type of Favorites that is created as a result of use of the television receiver by the user.

The icons 46 can represent at least the following content categorization:
  Favorite Channels: Displays channel icons that have been added to Favorites by the user.
  Favorite Inputs: Displays input icons that have been added to Favorites by the user.
  History: Displays the last 10 viewed items. Default item is most recently tuned channel/input which will display as Live Video Texture LVT (i.e., content plays live in the menu thumbnail) or icon. This displays persistently in Favorites. The History feature will be discussed in greater detail later.
  Ambient Player: Displays animation examples of Ambient Player themes that have been added to Favorites by the user. (These examples are fixed animations defined for each pre-set theme, and do not change). By default, all ambient viewers are marked as Favorites. The terms "ambient viewer" and "ambient player" are used herein to mean screen saver applications.
  Favorite Photos: Displays favorite photo content that has been added to Favorites by the user (USB or DLNA photos). By default, built-in photo contents are added to Favorites.
  Favorite Music: Displays favorite music content that has been added to Favorites by the user. (e.g., USB music). By default, built-in music contents can be added to Favorites. The user can create custom slideshows and playlists.
History content can include:
RF channels (any cable plan or antenna)
Physical Inputs
HDMI CEC logical inputs
Ambient Themes (e.g., screen saver)
Photo file
Music file
Video file
Internet Video (e.g., Internet video provider selection)
Widgets
In the History function, it is noted that the television user interface automatically stores a list of recently viewed content. Specifically, the content is not limited only to TV channels, but memorizes all kinds of content that can be displayed on the television, including cable or antenna channels, physical inputs, HDMI CEC logical inputs, and personal media (photos, music, videos) connected to the TV via USB or DLNA server, Widgets, and internet content (connected to the TV via network such as Bravia internet video link). This History list may be easily cleared by the user, and can also be automatically erased when powering off the TV. This History list provides easy access to recently viewed items, and provides a convenient user interface that requires no setup, as the contents are automatically stored as the user views things on their TV. Thus, although TV users are increasingly faced with expanding choices for content, the History function provides a convenient and simple feature which requires no setup by the user, to help the user find relevant content which has recently been viewed on their television.

The rules for defining what is stored in the History is defined as will be discussed in order to avoid cluttering the History list with extraneous items that are unlikely to be of interest so as to be more likely to provide quick access to desired content, channels or inputs.

In order to provide a History list which provides high likelihood of access to content of interest, rules are established to define which items are memorized as "recently-viewed" so as not to fill up the History list with items which might be viewed only momentarily while the user is surfing/browsing for content that is of interest. Also, duplicate items within History are removed from the list, so the list is not necessarily a "History" of all viewed content, but more a convenient collection of recently viewed items. Having a horizontal feature which cuts across different types of content which can be accessed by the television is a novel way to provide a unified user interface which simplifies the user experience. By treating all types of content as similar items (all able to be stored in the "recently viewed" feature), the overall television user interface is more unified and provides a simpler experience for the user to access content without needing to know about the source of the content In addition, the History list can provide a starting point storing and tracking user preferences as a means for moving towards a customized television experience. For instance, if the user desires, it may be possible to store the History list and if certain items appear with great frequency on the History list, those can automatically be saved into a user profile which simplifies setup of a personalized user experience. Users seem to desire some amount of customization of the user interface, but a barrier is usually the setup required to define those customization options. By using the History list as an automatically generated indication of user's viewing preferences, if the user so chooses, the History can be a convenient way to help customize with minimal setup effort.

The "History" or "Recently Viewed" feature automatically stores recently-viewed items, in effect being an automatic or dynamic "Favorites" list that the user does not need to manually program. The defaults and interactions of the History list are defined for this example as follows:
1. Default focus in History is on the last viewed item.
2. History is sorted with most recent at the top of the list.
3. The limit on number of items in History is 10.
4. The History list can be remembered per TV session (between Power On/Off of the TV is 1 TV session).
5. The History list can be reset when transitioning from Standby mode (via PC Power Management).
6. The History list can display only the channels for the current tuning mode (Cable or Antenna).
7. If the user changes tuning modes, channels within History list will be cleared.

Those skilled in the art will recognize upon consideration of the present teachings that these example rules for the History function can be modified without departing from the invention. For example, the number of items can be changed from 10 to 5 or 12 or 15 without departing from the invention. Additionally, while it is preferred that the History list is created on a per TV session basis, the History list could span multiple TV sessions. Other variations will occur to those skilled in the art upon consideration of the present example teachings.

In the preferred implementation, the History list is automatically defined by the TV and cannot be manually edited by the user. Valid History items are defined according to this implementation as follows:
1. Any channel tuned directly via the 10-key pad.
2. Any channel tuned for >15 seconds, including Auto Tune within Favorites, but excluding tuning within menus (e.g. Signal Diagnostics, Channel-related settings menus).
3. The currently viewed item upon entry into the History list will automatically be stored as the latest History item regardless of how long it was tuned.
4. Any input tuned by the user.
5. Any IPTV provider selected.
6. Any Widget selected.
7. Media files (Photo/Music/Video): Any file which starts the media viewer or slideshow (i.e. the file that the user has selected via XMB, thumbnail list, Favorites, or started a viewer via the Options menu, or which may be launched into slideshow mode via USB auto start option). This means items automatically viewed via slideshow or previous/next while within the media player are excluded from History.
8. Ambient player or screen saver.
9. Contents viewed during PIP and PAP will be omitted from History. But, note: the input/channel tuned prior to entry into PIP/PAP will be remembered, and the channel that is tuned after exiting from PIP/PAP will also be remembered (regardless of length of time on that channel/input).
10. Duplicates in History are automatically removed (only the most recently viewed instance is saved; prior duplicates are deleted from History)

Figure 5:
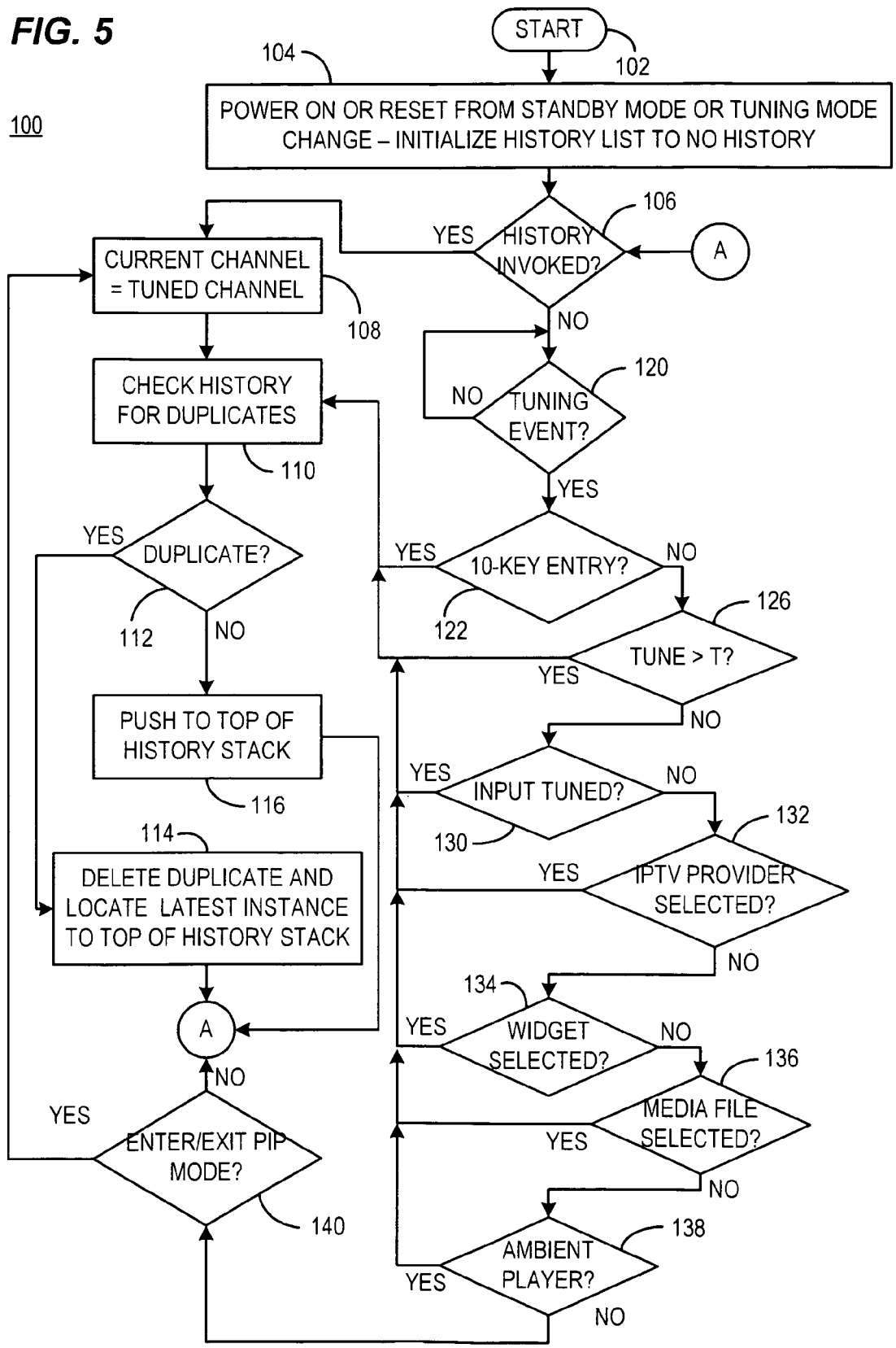
FIG. 5 is an illustrative example flow chart depicting one method of building the History list consistent with certain embodiments of the present invention.

One implementation of the rules described above to create the History list are implemented using the example flow chart 100 of FIG. 5 which implements a decision tree tracking the rules defined above starting at 102. Upon a power-up of the TV, reset from standby mode, tuning mode change or other action by the user to reset the History list (which can be provided as a user command in certain implementations) at 104, the History list is initialized to containing no entries. In other implementations, a default entry can be defined, e.g. as a program tuned when the TV is powered up.

The list remains static until an event occurs to update the list. One such event is the user invoking the History list at 106, in which case the current channel is set to the currently tuned channel at 108 and the History list is checked at 110 to determine if the tuned channel is already on the History list. If so at 112, it is undesirable to duplicate the channel, but if the channel is already on the History list it is deleted and the newest instance of that channel is placed at the top of the stack at 114 so as to appear first on the History list. (The History list is maintained like a stack data structure.) If the tuned channel is not a duplicate at 112, then the tuned channel is pushed to the top of the History list at 116. Any time the History stack is full and a new item is added, the last entry of the stack is dropped so that only a certain number, e.g., 10, items are maintained on the History list.

If the History function is not invoked at 106, the decision tree can determine if a tuning event as defined by the further decisions in the tree have taken place at 120. If so, the nature of the tuning event determines how the event is handled, and the order of the decision making shown in the decision tree is not to be considered limiting. In one case at 122, entry of a channel number via the 10-key pad 41 that is entered for purposes of tuning to a specific channel is considered a tuning event that is to be saved to the History list, thus, when a channel number entry is detected via the 10-key pad 41 at 122, control passes to 110 where duplicates are checked prior to entry on the list at 114 or rearrangement of the History list at 116.

If a channel is tuned by other means, such as channel up or channel down actions from a remote control 22, the process recognizes that a channel may be tuned in passing as the user is "channel surfing" or taking a shortcut to channel entry (e.g., tuning channel 10 from channel 8 by two channel up presses). Such passing tunes are not desirable in the History list since they are not likely to be of interest to the user. Hence, a time threshold such as 15 seconds is set, and the tuned channel is monitored for the duration of its selection at 126. If the channel has been selected for a time period greater than the time threshold, it is deemed to be a tuned channel for purposes of the History list and control is passed to 110.

If an input is changed at 130, an IPTV provider is selected at 132, a Widget is selected at 134, a media file is selected (other than as a file in a slide show as explained above) at 136 or an ambient player is selected at 138, each such event is considered to be an event that is to be saved to the History list, and control is passed to 110. If a Picture-In-Picture function is entered or exited at 140, the current channel at the time of entry or exit is considered a tuned channel at 108 and is then checked for duplicates at 110 and either added to the History list or is used to control the order of the History list in the event of a duplicate as previously described.

Figure 6:
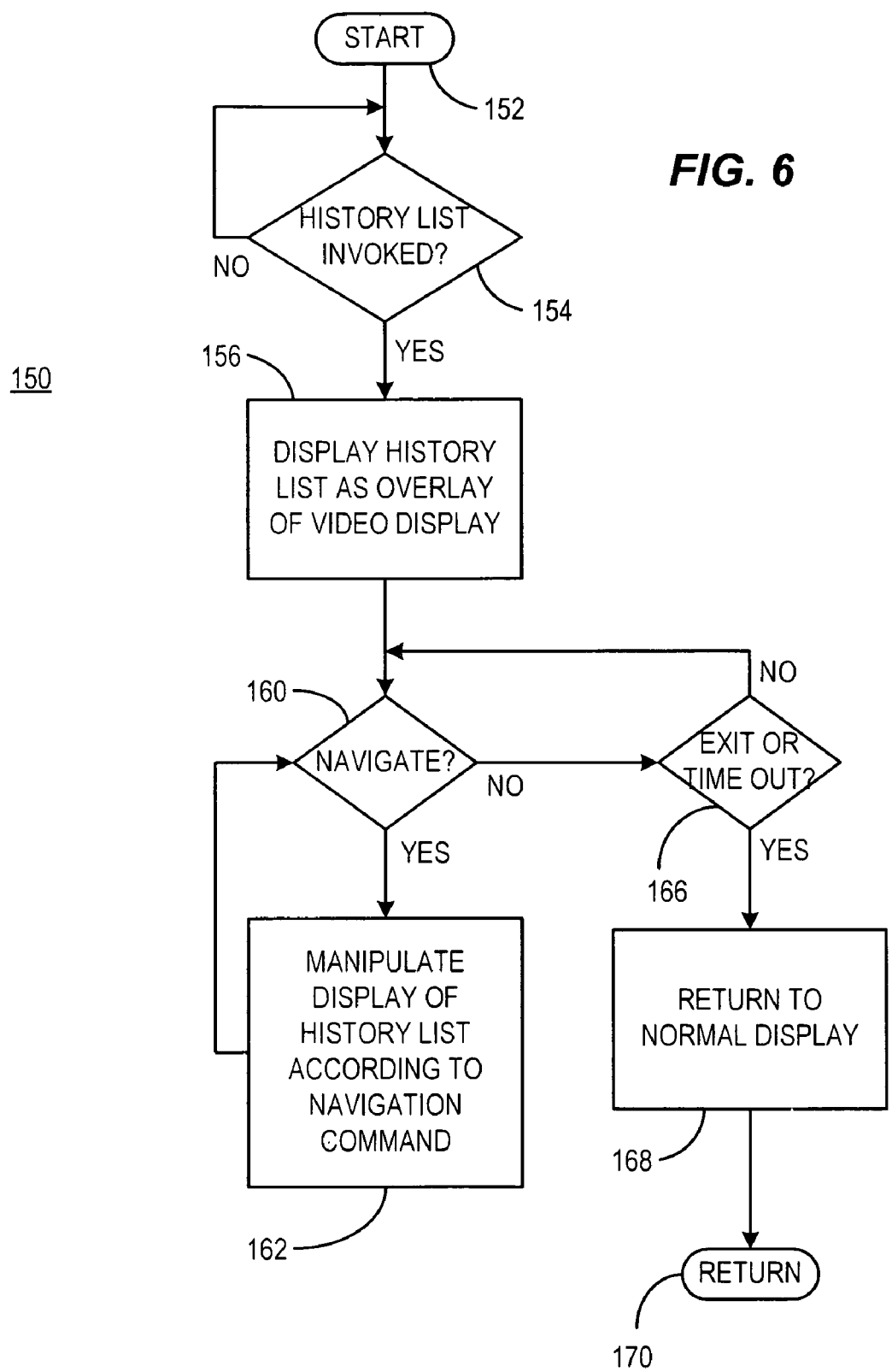
FIG. 6 is an illustrative example flow chart depicting one method of invoking and displaying the History list in a manner consistent with certain embodiments of the present invention.

Once the History list function is established as a menu item, it is preferably navigated in a manner that will be familiar to the user as an integral part of the operation of the menu. Broadly, however, operation of the menu function is depicted in FIG. 6 as process 150 starting at 152. When the History list is invoked at 154 in any suitable manner (direct invocation from a History key on the remote control, via the Favorites Menu, via another menu selection, etc.), the History list is displayed on the display at 156, preferably but not necessarily in the manner depicted in FIGS. 2-4. At 160, if the user executes a navigation command, the display of the history list is manipulated in accord with the navigation command at 162 and control returns to 160. Otherwise, if the user exits or the system times out at 166, the system returns to a normal display absent the history list at 168 and the process returns at 170. If not time out or exit is encountered at 166, the process returns to 160.

Figure 7:
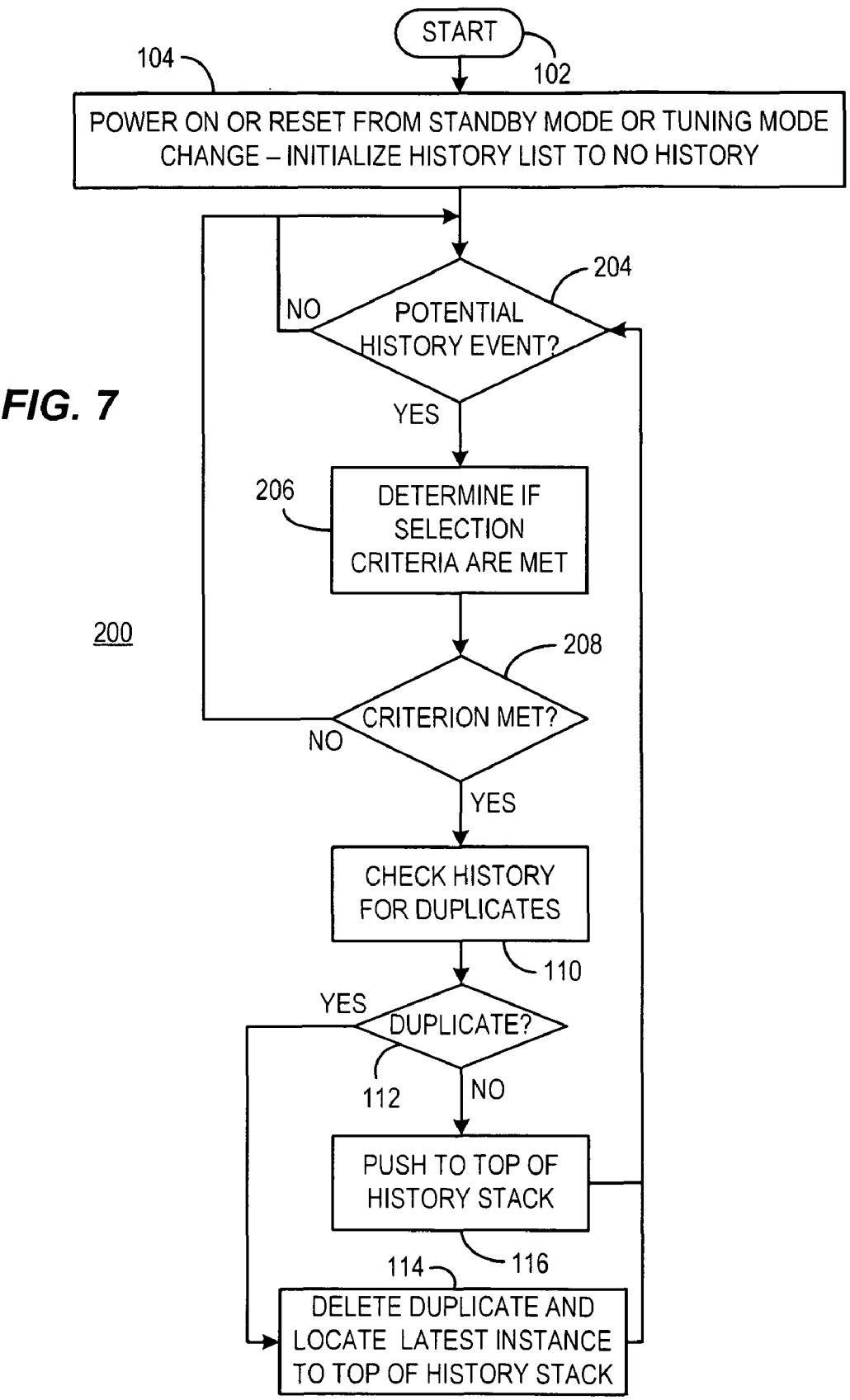
FIG. 7 is an illustrative example flow chart depicting an example process for building the History list in a manner consistent with certain embodiments of the present invention.

FIG. 7 is a flow chart of process 200 (with like elements from process 100 being similarly numbered) that describes the list maintenance function in generalized terms starting at 102 with the list being initialized as before at 104. When a potential History list event occurs at 204, the process determines at 206 if a History event criterion has been met. If not, the process returns to 204. If any one of the History list criteria is met at 208, the process proceeds to 110 where the duplicate checking functions as described previously are implemented.

Thus, a television system consistent with certain implementations presents the user with a list of recently viewed objects as a History list that meets one of a set of History list criteria. The History list is maintained as an ordered stack list with a limited number of entries, the order being an order in which the most recently met rule appears at the top of the list.

Thus, a television system consistent with certain implementations has a television including a television display. The television has a processor for presenting on the television display, in response to a user command, a user interface that presents the user with a list of recently viewed objects as a History list. The History list includes a list of objects that meet at least one of the criteria established as stored rules that define valid History list events, the stored rules defining the valid History list events comprising at least rules that determine that: a 10-key direct tuned television channel number has been tuned, a channel that has been tuned for more than a threshold amount of time, a video source that has been selected, an Internet television service provider that has been selected, a television Widget that has been selected, a media file that has been selected, and an object is active at the time when the History list is invoked. The History list is maintained as an ordered stack list with a limited number of entries, the order being an order in which the most recently met rule appears at the top of the list.

In certain implementations, the stored rules defining the valid History list events further comprises a rule that determines that an ambient player (screen saver) that has been selected. In certain implementations, the stored rules defining the valid History list events further comprises a rule that determines a channel that is tuned while entering or leaving a picture-in-picture display mode. In certain implementations, the processor checks the History list for duplicates when an instance of an object meets one of the criteria, and in the event of detection of a duplicate, deletes the duplicate and places the latest instance of the object at the top of the list. In certain implementations, the command comprises a command that invokes a menu of Favorites that includes the History list. In certain implementations, the menu of Favorites is displayed as a horizontal sequence of icons with a History list icon situated at the center of the horizontal sequence of icons. In certain implementations, the History list icon is selected by default upon invocation of the menu of Favorites and is displayed as a larger icon than other icons in the sequence of icons. In certain implementations, the History icon is depicted as a file folder, and History list entries are depicted as items inside the file folder, and where the History list icons are navigated by user commands that display the History icons as pages being turned in the file folder. In certain implementations, the menu of Favorites is displayed as a horizontal sequence of icons with a plurality of History list entries situated at the center of the horizontal sequence of icons, where a latest entry is at the center and is flanked by other History list entries. In certain implementations, the History list entries are selected by default upon invocation of the menu of Favorites and are displayed in a larger icon window than other icons in the sequence of icons. In certain implementations, the History list is initialized upon any one of power-on of the television system, resetting the television system from standby, and changing a tuning mode.

In another implementation, a television system has a television including a television display. The television has a processor for presenting on the television display, in response to a user command, a user interface that presents the user with a list of recently viewed objects as a History list. The History list is a list of objects that meet at least one of the criteria established as stored rules that define valid History list events, the stored rules defining the valid History list events comprising at least rules that determine that: a 10-key direct tuned television channel number has been tuned, a channel that has been tuned for more than a threshold amount of time, a video source that has been selected, an Internet television service provider that has been selected, a television Widget that has been selected, an ambient player that has been selected, a channel is tuned while entering or leaving a picture-in-picture display mode, a media file that has been selected, and an object is active at the time when the History list is invoked. The History list is maintained as an ordered stack list with a limited number of entries, the order being an order in which the most recently met rule appears at the top of the list. The processor checks the History list for duplicates when an instance of an object meets one of the criteria, and in the event of detection of a duplicate, deletes the duplicate and places the latest instance of the object at the top of the list.

In certain implementations, the command comprises a command that invokes a menu of Favorites that includes the History list. In certain implementations, the menu of Favorites is displayed as a horizontal sequence of icons with a History list icon situated at the center of the horizontal sequence of icons. In certain implementations, the History list icon is selected by default upon invocation of the menu of Favorites and is displayed as a larger icon than other icons in the sequence of icons. In certain implementations, the History icon is depicted as a file folder, and History list entries are depicted as items inside the file folder, and where the History list icons are navigated by user commands that display the History icons as pages being turned in the file folder. In certain implementations, the menu of Favorites is displayed as a horizontal sequence of icons with a plurality of History list entries situated at the center of the horizontal sequence of icons, where a latest entry is at the center and is flanked by other History list entries. In certain implementations, the History list entries are selected by default upon invocation of the menu of Favorites and are displayed in a larger icon window than other icons in the sequence of icons. In certain implementations, the History list is initialized upon any one of power-on of the television system, resetting the television system from standby, and changing a tuning mode.

Another television system consistent with the present invention has a television including a television display. The television has a processor for presenting on the television display, in response to a user command, a user interface that presents the user with a list of recently viewed objects as a History list. The command includes a command that invokes a menu of Favorites that includes the History list. The History list is a list of objects that meet at least one of the criteria established as stored rules that define valid History list events, the stored rules defining the valid History list events comprising at least rules that determine that: a 10-key direct tuned television channel number has been tuned, a channel that has been tuned for more than a threshold amount of time, a video source that has been selected, an Internet television service provider that has been selected, a television Widget that has been selected, an ambient player that has been selected, a channel is tuned while entering or leaving a picture-in-picture display mode, a media file that has been selected, and an object is active at the time when the History list is invoked. The History list is maintained as an ordered stack list with a limited number of entries, the order being an order in which the most recently met rule appears at the top of the list. The processor checks the History list for duplicates when an instance of an object meets one of the criteria, and in the event of detection of a duplicate, deletes the duplicate and places the latest instance of the object at the top of the list. The menu of Favorites is displayed as a horizontal sequence of icons with a History list icon situated at the center of the horizontal sequence of icons and displayed as a larger icon than other icons in the sequence of icons. Under user selection, the History icon is depicted as either a file folder, and History list entries are depicted as items inside the file folder, and where the History list icons are navigated by user commands that display the History icons as pages being turned in the file folder, or the History icon is depicted as a horizontal sequence of icons with a plurality of History list entries situated at the center of the horizontal sequence of icons, where a latest entry is at the center and is flanked by other History list entries. The History list entries are selected by default upon invocation of the menu of Favorites and are displayed in a larger icon window than other icons in the sequence of icons. The History list is initialized upon any one of power-on of the television system, resetting the television system from standby, and changing a tuning mode.

Those skilled in the art will recognize, upon consideration of the above teachings, that certain of the above exemplary embodiments are based upon use of a programmed processor. However, the invention is not limited to such exemplary embodiments, since other embodiments could be implemented using hardware component equivalents such as special purpose hardware and/or dedicated processors. Similarly, general purpose computers, microprocessor based computers, micro-controllers, optical computers, analog computers, dedicated processors, application specific circuits and/or dedicated hard wired logic may be used to construct alternative equivalent embodiments.

Certain embodiments described herein, are or may be implemented using a programmed processor or hardware circuitry executing functions that are broadly described above in flow chart form that can be stored as instructions on any suitable electronic or computer readable storage medium. However, those skilled in the art will appreciate, upon consideration of the present teaching, that the processes described above can be implemented in any number of variations and in many suitable programming languages without departing from embodiments of the present invention. For example, the order of certain operations carried out can often be varied, additional operations can be added or operations can be deleted without departing from certain embodiments of the invention. Error trapping can be added and/or enhanced and variations can be made in user interface and information presentation without departing from certain embodiments of the present invention. Such variations are contemplated and considered equivalent.

While certain illustrative embodiments have been described, it is evident that many alternatives, modifications, permutations and variations will become apparent to those skilled in the art in light of the foregoing description.

What is claimed is:

1. A television system, comprising:
   a television including a television display;
   the television comprising a processor programmed to:
   present on the television display, in response to a user command, a user interface that presents the user with a list of recently viewed objects as a History list, where the History list comprises a list of objects that represent different types of content sources that are added to the History list responsive to user selection events of content provided by the different types of content sources based upon criteria established as a plurality of stored rules that define valid History list events; and
   build the History list by processing the plurality of stored rules;
   where the plurality of stored rules specify at least each of the following:

adding a video source object to the History list in response to a determination that a video source has been selected;

adding an Internet television object to the History list in response to a determination that an Internet television service provider has been selected;

adding a television Widget object to the History list in response to a determination that a television Widget has been selected;

adding a media file object to the History list in response to a determination that a media file has been selected;

adding a channel object to the History list in response to a determination that:

a 10-key television channel number has been directly tuned or a channel has been tuned for more than a threshold amount of time; and adding an active object to the History list in response to a determination that an object is active at the time when the History list is invoked; and where the History list is maintained as an ordered stack list with a limited number of entries, the order being an order in which the most recently met rule appears at the top of the list.

2. The television system according to claim 1, where the stored rules defining the valid History list events further comprise a rule that determines that an ambient player has been selected and that specifies adding an ambient player object to the History list in response to the determination that the ambient player has been selected.

3. The television system according to claim 1, where the stored rules defining the valid History list events further comprise a rule that determines a channel that is tuned while entering or leaving a picture-in-picture display mode and that specifies adding a channel object representing the tuned channel to the History list in response to the determination that the channel is tuned while entering or leaving the picture-in-picture display mode.

4. The television system according to claim 1, where the processor checks the History list for duplicates when an instance of an object meets one of the criteria, and in the event of detection of a duplicate, deletes the duplicate and places the latest instance of the object at the top of the list.

5. The television system according to claim 1, where the command comprises a command that invokes a menu of Favorites that includes the History list.

6. The television system according to claim 5, where the menu of Favorites is displayed as a horizontal sequence of icons with a History list icon situated at the center of the horizontal sequence of icons.

7. The television system according to claim 6, where the History list icon is selected by default upon invocation of the menu of Favorites and is displayed as a larger icon than other icons in the sequence of icons.

8. The television system according to claim 6, where the History icon is depicted as a file folder, and History list entries are depicted as items inside the file folder, and where the History list icons are navigated by user commands that display the History icons as pages being turned in the file folder.

9. The television system according to claim 5, where the menu of Favorites is displayed as a horizontal sequence of icons with a plurality of History list entries situated at the center of the horizontal sequence of icons, where a latest entry is at the center and is flanked by other History list entries.

10. The television system according to claim 9, where the History list entries are selected by default upon invocation of the menu of Favorites and are displayed in a larger icon window than other icons in the sequence of icons.

11. The television system according to claim 1, where the History list is initialized upon any one of power-on of the television system, resetting the television system from standby, and changing a tuning mode.

12. A television system, comprising:

a television including a television display;

the television comprising a processor programmed to:

present on the television display, in response to a user command, a user interface that presents the user with a list of recently viewed objects as a History list, where the History list comprises a list of objects that represent different types of content sources that are added to the History list responsive to user selection events of content provided by the different types of content sources based upon criteria established as a plurality of stored rules that define valid History list events; and build the History list by processing the plurality of stored rules;

where the plurality of stored rules specify at least each of the following:

adding a video source object to the History list in response to a determination that a video source has been selected;

adding an Internet television object to the History list in response to a determination that an Internet television service provider has been selected; adding a television Widget object to the History list in response to a determination that a television Widget has been selected;

adding an ambient player object to the History list in response to a determination that an ambient player has been selected;

adding a channel object to the History list in response to a determination that:

a 10-key television channel number has been directly tuned, a channel has been tuned for more than a threshold amount of time, or a channel is tuned while entering or leaving a picture-in-picture display mode;

adding a media file object to the History list in response to a determination that a media file has been selected; and adding an active object to the History list in response to a determination that an object is active at the time when the History list is invoked;

where the History list is maintained as an ordered stack list with a limited number of entries, the order being an order in which the most recently met rule appears at the top of the list; and where the processor checks the History list for duplicates when an instance of an object meets one of the criteria, and in the event of detection of a duplicate, deletes the duplicate and places the latest instance of the object at the top of the list.

13. The television system according to claim 12, where the command comprises a command that invokes a menu of Favorites that includes the History list.

14. The television system according to claim 13, where the menu of Favorites is displayed as a horizontal sequence of icons with a History list icon situated at the center of the horizontal sequence of icons.

15. The television system according to claim 14, where the History list icon is selected by default upon invocation of the menu of Favorites and is displayed as a larger icon than other icons in the sequence of icons.

16. The television system according to claim 14, where the History icon is depicted as a file folder, and History list entries are depicted as items inside the file folder, and where the History list icons are navigated by user commands that display the History icons as pages being turned in the file folder.

17. The television system according to claim 13, where the menu of Favorites is displayed as a horizontal sequence of icons with a plurality of History list entries situated at the center of the horizontal sequence of icons, where a latest entry is at the center and is flanked by other History list entries.

18. The television system according to claim 17, where the History list entries are selected by default upon invocation of the menu of Favorites and are displayed in a larger icon window than other icons in the sequence of icons.

19. The television system according to claim 13, where the History list is initialized upon any one of power-on of the television system, resetting the television system from standby, and changing a tuning mode.

20. A television system, comprising:
a television including a television display;
the television comprising a processor programmed to:
present on the television display, in response to a user command, a user interface that presents the user with a list of recently viewed objects as a History list, where the command comprises a command that invokes a menu of Favorites that includes the History list and the History list comprises a list of objects that represent different types of content sources that are added to the History list responsive to user selection events of content provided by the different types of content sources based upon criteria established as a plurality of stored rules that define valid History list events; and
build the History list by processing the plurality of stored rules;
where the plurality of stored rules specify at least each of the following:
adding a video source object to the History list in response to a determination that a video source has been selected;
adding an Internet television object to the History list in response to a determination that an Internet television service provider has been selected;
adding a television Widget object to the History list in response to a determination that a television Widget has been selected;
adding an ambient player object to the History list in response to a determination that an ambient player has been selected;
adding a channel object to the History list in response to a determination that:
a 10-key television channel number has been directly tuned,
a channel has been tuned for more than a threshold amount of time, or
a channel is tuned while entering or leaving a picture-in-picture display mode;
adding a media file object to the History list in response to a determination that a media file has been selected; and
adding an active object to the History list in response to a determination that an object is active at the time when the History list is invoked;
where the History list is maintained as an ordered stack list with a limited number of entries, the order being an order in which the most recently met rule appears at the top of the list;
where the processor checks the History list for duplicates when an instance of an object meets one of the criteria, and in the event of detection of a duplicate, deletes the duplicate and places the latest instance of the object at the top of the list;
where the menu of Favorites is displayed as a horizontal sequence of icons with a History list icon situated at the center of the horizontal sequence of icons and displayed as a larger icon than other icons in the horizontal sequence of icons;
where, under user selection, the History list icon is depicted as either a file folder, and History list entries are depicted as items inside the file folder, and where History list icons are navigated by user commands that display the History list icons as pages being turned in the file folder, or the History list icon is depicted as a horizontal sequence of icons with a plurality of History list entries situated at the center of the horizontal sequence of icons, where a latest entry is at the center and is flanked by other History list entries;
where the History list entries are selected by default upon invocation of the menu of Favorites and are displayed in a larger icon window than other icons in the horizontal sequence of icons; and
where the History list is initialized upon any one of power-on of the television system, resetting the television system from standby, and changing a tuning mode.

* * * * *